Aug. 14, 1945.   C. M. LENT   2,381,915
FLAT COATING COMPOSITION AND OIL CLOTH MADE THEREFROM
Filed July 30, 1941
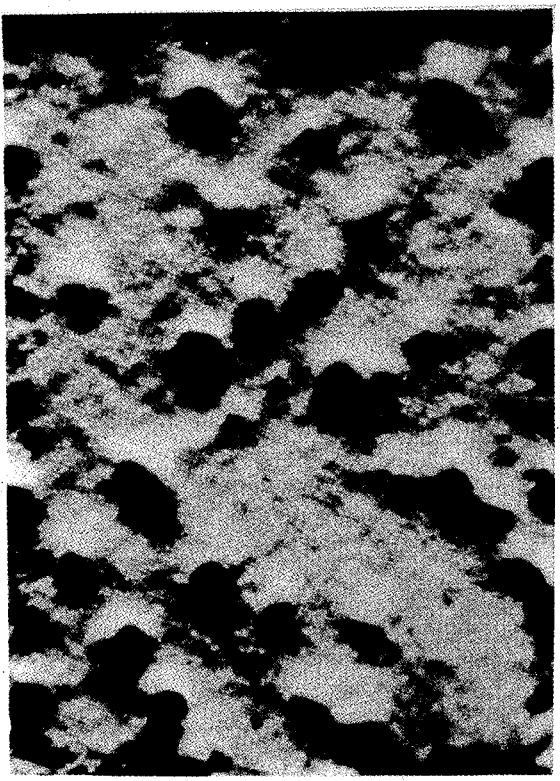
INVENTOR.
CLIFFORD M. LENT
BY
Milton Zucker
ATTORNEY.

Patented Aug. 14, 1945

2,381,915

UNITED STATES PATENT OFFICE 2,381,915

FLAT COATING COMPOSITION AND AN OILCLOTH MADE THEREFROM

Clifford M. Lent, Peekskill, N. Y., assignor, by mesne assignments, to Interchemical Corporation, a corporation of Ohio Application July 30, 1941, Serial No. 404,645

11 Claims. (Cl. 106—132)

This invention relates to a dull finished oil cloth and the composition used in its preparation.

Oil cloth has been made for many years in substantially the same manner. Conventionally, a fabric, generally a cheap cotton, is filled with an emulsion of drying oil and wet clay, applied by a coating machine. Two coats are generally required to fill the weave of the fabric. A base coat is then applied; this consists of covering pigment and drying oil, sufficient oil being present to insure a flexible film. The final coat is the so-called glaze coat, containing a high ratio of oil to pigment to insure flexibility during the life of the oil cloth. The pigment volume in this top coat generally ranges from about 30%, approximating that of a good house paint, to about 50%. However, the finish obtained is superior to that of a house paint since the oils are bodied, dispersion is superior and the coating methods are better. The glossy finish coat is then decorated by printing as desired.

As long as oil cloth was sold for table use, the high gloss was desirable; but the utilization of the material for wall coverings caused a demand for reduction of gloss, to as near an approach to a dead flat as possible. The use of metallic soaps and similar flatting agents produced films which cracked badly on flexing; and the art finally compromised with the demand by increasing the pigment volume to the limit consistent with flexibility. At this pigment volume, of about 60%, the resultant finish is not completely dull, but has an eggshell sheen. Embossing is used to break up the surface, but the dullest possible material has never been dull enough to meet certain demands of the trade. This trade has consistently avoided oil cloth, and used wall paper or flat wall paint to get the desired effect.

I have invented an oil cloth which has the flexibility and long life of ordinary high gloss oil cloth, combined with a dead flat finish. This oil cloth comprises an ordinary oil cloth finished with a pigmented oil composition having a low pigment volume, preferably approximating that of the glaze coat of ordinary oil cloth, but which has a flat surface due to a flocculated structure set up in the coating.

The structure is obtained by emulsifying into the composition a small percentage of water acidified to, or preferably slightly below, the pseudo-iso-electric point of the pigment used in the coating composition. With lithopone and titanium pigments (the commonly used pigments) this point is about pH=4.2; the preferred pH is from about 3.0 to 4.0. Preferably, an emulsifying agent is used to maintain the structure; a protein like glue, with an iso-electric point approximating that of the pigment, is preferred, although other agents are satisfactory. The emulsification and subsequent flocculation produces a coating of rather heavy consistency, which can nevertheless be successfully coated by ordinary means.

The coating, after application, must be dried without substantial disturbance of the surface; any disturbance after initial setting and before final hardening produces glossy spots. This glossing appears to be due to a breaking down of the structure, and a reattainment of the ordinary enamel characteristics.

The film, on examination under the microscope, shows certain unusual characteristics. While the flatting appears to be due essentially to the flocculated state of the pigment, the flatting appears to be helped somewhat by the honeycomb (foraminous) structure of the film, which contains large numbers of bubbles of the order of 0.1 millimeter and smaller in diameter, dispersed through the film from top to bottom. This honeycomb structure does not appear to affect the wash-resistance of the film because, when compared with ordinary glazed oil cloth and ordinary dull oil cloth, my new product resisted washing and cleaned up as well as the glazed cloth, and far better than ordinary dull cloth. The foraminous product, however, has an advantage in that it obviously reflects sound waves to a lesser extent than the ordinary oil cloths or paint films, which are almost perfect reflectors for sound waves, due to their impervious films.

This foraminous structure is shown in the accompanying drawing, which is a photomicrograph at 75 diameters.

The following examples show typical applications of my invention:

Example 1

An oil cloth was conventionally prepared with two filler coats and a base coat, and then it was given a final, finishing coat on an ordinary roll coating machine, with the following composition:

|  | Parts by weight |
|---|---|
| Bodied linseed oil (viscosity between about 400 and 500 poises—oil was thixotropic) containing 3% Amberol BS-1 | 168 |
| Lithopone | 300 |
| Naphtha | 10 | were milled together to give a smooth paste called a "glaze."

This paste was thinned with

|  | Parts by weight |
|---|---|
| Kerosene | 20 |
| Naphtha | 25 |

To the thinned paste was added:

|  | Parts by weight |
|---|---|
| A hide glue solution | 17 |
| 28% acetic acid | 5 |

The hide glue solution consisted of:

| | Parts |
|---|---|
| Hide glue | 1 |
| Water | 6 |
| Dowicide (or other bactericide to prevent molding) | 0.01 |

The above mixture was carefully stirred to give a complex emulsion. The ratio of pigment volume to total film volume was about 41%, and the pH of the water system was about 3.8, or just below the pseudo-iso-electric point of lithopone.

On drying of this film, a dull smooth coating was obtained which was as flexible as the ordinary glaze coat, and washed and cleaned up as well. Moreover, it had the typical honeycomb structure described above and illustrated in the drawing.

It is important that the coated web should not be disturbed after its initial setting, which is due to loss of volatile matter, since pressure applied to the film, while still wet, causes the disruption of the aggregated structure, and gives a shiny enamel-like finish.

*Example 2*

| | Parts by weight |
|---|---|
| The glaze of Example 1 | 128 |
| Kerosene | 12.5 |
| 28% acetic acid | 1.0 |
| A 10% solution of polyvinyl alcohol in water | 4.0 |

The above mixture was mixed and applied as in Example 1. The finish obtained was even duller than that obtained in Example 1, but it was not as velvety to the touch. The mixture was stable on standing.

Other satisfactory flat coating compositions are given by way of illustration in the following examples:

*Example 3*

| | Parts by weight |
|---|---|
| Lithopone | 300 |
| Bodied linseed oil mixed with equal parts of wood oil and containing small amounts of lead, cobalt and manganese driers; and about 2% of Amberol BS-1 | 190 |
| Kerosene | 20 |
| Naphtha | 35 |
| Glue solution, which consisted of 5 parts glue and 95 parts of 28% acetic acid | 27 |

The mixture was compounded and applied as in Example 1.

If desired, wetting agents can be added to the emulsion to improve its wetting out properties and to improve its flow on the coating machine.

*Example 4*

| | Parts by weight |
|---|---|
| Lithopone | 500 |
| Bodied linseed oil (containing 2% Amberol BS-1 and driers) | 150 |
| Kerosene | 50 |
| Naphtha | 100 |

This mixture was milled until a uniform paste was obtained. Then 12 parts of the glue solution of Example 1 and 4 parts of 28% acetic acid were added, with ½ part of Aerosol (a wetting agent). The final emulsion gave a coating very much the same as Example 1 in appearance, but the emulsion was more easily applied to the oil cloth base.

The amount of pigment which may be used in these coating compositions is not critical. However, the pigment-to-binder volume ratio should not be much in excess of about 1 if the flat oil cloth is to be used for wall hanging, as excessive pigment causes poor hanging properties and makes the cloth difficult to handle. This pigment-to-binder ratio is commonly used in the preparation of conventional glossy oil cloths.

The following examples illustrate different pigment-to-binder ratios, and different pigments, in addition to the preceding examples:

*Example 5*

| | Parts by weight |
|---|---|
| Titanium barium pigment (Titanox B) | 500 |
| Bodied linseed oil from Example 4 | 175 |
| Kerosene | 50 |
| Glue solution of Example 1 | 10 |
| 28% acetic acid | 4 |
| Naphtha | 200 |
| Aerosol OT (wetting agent) | 1 |

The above materials were compounded as described in Example 4, to give a stable coating composition which dried to a very dull surface.

*Example 6*

| | Parts by weight |
|---|---|
| Lithopone | 300 |
| Bodied linseed oil of Example 4 | 150 |
| Kerosene | 20 |
| Glue solution of Example 1 | 14 |
| 28% acetic acid | 5 |
| Naphtha | 30 |

The above materials were made into an emulsion in the manner described in Example 1.

*Example 7*

| | Parts by weight |
|---|---|
| Titanium barium pigment (Titanox B) | 500 |
| Bodied linseed oil of Example 4 | 90 |
| Kerosene | 50 |
| Glue solution of Example 1 | 6 |
| 28% acetic acid | 3 |
| Naphtha | 200 |

The above materials were mixed as described in Example 1.

The dull or flat surfaces obtained with these coating compositions have the advantage of being absorptive even when unwetted by the liquid brought in contact therewith. Thus, they are easily and uniformly printed with many kinds of inks and lacquers. In fact, the surfaces that these coating compositions leave on drying are much like paper in absorptive properties.

The chief distinguishing characteristic of wall coverings prepared with these compositions is that they present this unique, dull surface even though the pigment concentration (or pigment-to-binder ratio) is low. In fact, the preferred pigment-to-binder ratio is at least as low as that employed in the preparation of conventional, glossy oil cloths.

Many variations will be obvious to those skilled in the art. Thus, the organic solvent may be omitted in preparing the emulsions, although addition of some solvent is usually necessary to thin out the emulsion in order to make it easier to spread. Any drying oil binder may be used in place of the linseed oil shown. Both wood oil and fish oils may be substituted, and flexible binders made from other resins such as the alkyd resins, are included within the scope of this invention. Likewise, any pigments may be employed, and if desired, various dyes may be blended in the emulsions to yield any shade or color in the dried, flat surface. Also, the coating emulsions described may be used on many kinds of surfaces, such as plaster walls, wood and the like, although they are particularly designed for use in making flat oil cloths.

I claim:

1. An oil cloth-like material suitable for use as a wall covering which comprises, a clay-filled fabric oil cloth base bearing a finishing coat comprising an ordinary oil cloth glaze in which the pigment-to-binder volume ratio does not exceed about 1, characterized by its foraminous surface bearing minute holes varying in size up to about 0.1 mm., and appearing as a dull or flat surface.

2. An oil cloth-like material suitable for use as a wall covering which comprises, a clay-filled fabric oil cloth base bearing a finishing coat, said finishing coat comprising a drying oil binder, pigment in a pigment-to-binder volume ratio not exceeding about 1, and glue, said finishing coat being characterized by its foraminous surface bearing minute holes varying in size up to about 0.1 mm., and appearing as a dull or flat surface.

3. A coating composition which dries to a dead flat flexible film, which comprises a dispersion of pigment in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted approximately to slightly below the pseudo-iso-electric point of the pigment.

4. A coating composition which dries to a dead flat flexible film, which comprises a dispersion of pigment in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted approximately to slightly below the pseudo-iso-electric point of the pigment, the aqueous fluid having dispersed therein an emulsion stabilizer.

5. A coating composition which dries to a dead flat flexible film, which comprises a dispersion of pigment in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted approximately to slightly below the pseudo-iso-electric point of the pigment, the aqueous fluid having dispersed therein an emulsion stabilizer comprising glue.

6. A coating composition which dries to a dead flat flexible film, which comprises a dispersion of pigment in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted approximately to slightly below the pseudo-iso-electric point of the pigment, the aqueous fluid having dispersed therein an emulsion stabilizer comprising glue, the pH being obtained by the use of a weak acid.

7. A coating composition which dries to a dead flat flexible film, which comprises a dispersion of pigment of the class consisting of lithopone and extended titanium dioxide in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted to approximately from 3.0 to 4.2.

8. A coating composition which dries to a dead flat flexible film, which comprises a dispersion of pigment of the class consisting of lithopone and extended titanium dioxide in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted to approximately from 3.0 to 4.2 by the use of a weak acid.

9. A coating composition which dries to a dead flat flexible film, which comprises a dispersion of pigment of the class consisting of lithopone and extended titanium dioxide in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted to approximately from 3.0 to 4.2 by the use of a weak acid, the aqueous fluid having an emulsion stabilizer therein.

10. A coating composition which dries to a dead flat flexible film, which comprises a dispersion of pigment of the class consisting of lithopone and extended titanium dioxide in a vehicle whose major binder constituent comprises drying oil, the ratio of pigment volume to binder volume not exceeding about 1.0, whereby the composition would normally dry to a film having some gloss, the composition having dispersed therein a small percentage of an aqueous fluid whose pH is adjusted to approxiately from 3.0 to 4.2 by the use of a weak acid, the aqueous fluid having an emulsion stabilizer therein comprising glue.

11. An oil cloth-like material suitable for use as a wall covering which comprises, a clay-filled fabric oil cloth base bearing a finishing coat, said finishing coat comprising a drying oil binder, pigment in a pigment-to-binder volume ratio not exceeding about 1, said finishing coat being characterized by its foraminous surface bearing minute holes varying in size up to about 0.1 mm., and appearing as a dull or flat surface.

CLIFFORD M. LENT.